(12) United States Patent
Zong et al.

(10) Patent No.: US 10,581,334 B2
(45) Date of Patent: Mar. 3, 2020

(54) DC-DC CONVERTER AND CONTROL METHOD

(71) Applicant: ABB Schweiz AG, Baden (CH)

(72) Inventors: Sheng Zong, Beijing (CN); Xiaobo Yang, Beijing (CN); Guoxing Fan, Beijing (CN); Dawei Yao, Beijing (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/430,489

(22) Filed: Jun. 4, 2019

(65) Prior Publication Data
US 2019/0288607 A1 Sep. 19, 2019

Related U.S. Application Data

(63) Continuation of application No. PCT/CN2017/072907, filed on Feb. 4, 2017.

(51) Int. Cl.
*H02M 3/335* (2006.01)
*H02M 1/08* (2006.01)
*H02M 1/00* (2006.01)

(52) U.S. Cl.
CPC ....... *H02M 3/33584* (2013.01); *H02M 1/083* (2013.01); *H02M 2001/0058* (2013.01); *Y02B 70/1433* (2013.01); *Y02B 70/1491* (2013.01)

(58) Field of Classification Search
CPC ........ H02M 3/22; H02M 3/325; H02M 3/335; H02M 3/33507; H02M 3/33584;
(Continued)

(56) References Cited

U.S. PATENT DOCUMENTS 8,467,199 B2 6/2013 Lee et al.
9,190,911 B2 11/2015 Dai et al.
(Continued)

FOREIGN PATENT DOCUMENTS

CN 103475232 A 12/2013
CN 103715907 A 4/2014
(Continued)

OTHER PUBLICATIONS

Intellectual Property Office of the P.R. China, International Search Report & Written Opinion issued in corresponding Application No. PCT/CN2017/072907, dated Nov. 13, 2017, 9 pp.
(Continued)

*Primary Examiner* — Adolf D Berhane
(74) *Attorney, Agent, or Firm* — Taft Stettinius & Hollister LLP; J. Bruce Schelkopf (57) ABSTRACT

The application relates to a DC to DC converter and control method thereof. The DC to DC converter includes a first converter circuit, a second converter circuit, a transformer having a primary winding and a secondary winding, a first resonant tank having a first capacitive element and a first inductive element, and a second resonant tank having a second capacitive element and a second inductive element. The first capacitive element and the first inductive element are coupled between the first converter circuit and the primary winding of the transformer; the second capacitive element and the second inductive element are coupled between the second converter circuit and the secondary winding of the transformer. During power transfer from the second converter circuit to the first converter circuit, a first plurality of first power-semiconductor-devices of the first converter circuit are operable to charge the first capacitive element during a first half cycle of a switching period; and a second plurality of the first power-semiconductor-devices
(Continued)

of the first converter circuit are operable to provide an output voltage comprising an voltage across the primary winding of the transformer and the voltage of the first capacitive element superimposed thereon. This provides step-up gain for the backward direction, the first converter circuit operating in double voltage rectification manner and the second converter circuit working in the conventional full-bridge modulation with switching frequency fixed substantially at the resonant frequency.

20 Claims, 4 Drawing Sheets

(58) Field of Classification Search
CPC ............. H02M 3/33569; H02M 1/083; H02M 2001/0058; H02M 2001/0048; Y02B 70/1433; Y02M 70/1491
See application file for complete search history.

(56) References Cited

U.S. PATENT DOCUMENTS

| | | | |
|---|---|---|---|
| 9,548,668 B2 * | 1/2017 | Fu | H02M 3/33569 |
| 9,774,269 B2 | 9/2017 | Matsubara et al. | |
| 2012/0002446 A1 * | 1/2012 | Madawala | B60L 55/00 |
| | | | 363/17 |
| 2013/0194831 A1 | 8/2013 | Hu | |
| 2015/0229225 A1 * | 8/2015 | Jang | H02M 3/285 |
| | | | 363/17 |
| 2016/0043562 A1 * | 2/2016 | Lisi | H02J 5/005 |
| | | | 307/104 |
| 2016/0149501 A1 * | 5/2016 | Dai | H02M 3/337 |
| | | | 363/21.02 |
| 2016/0254754 A1 * | 9/2016 | Perreault | H02M 3/07 |
| | | | 363/21.03 |
| 2016/0380547 A1 * | 12/2016 | Chen | H02M 3/22 |
| | | | 363/17 |
| 2017/0229921 A1 * | 8/2017 | Hwang | H03F 3/3015 |
| 2018/0198373 A1 * | 7/2018 | Torrico-Bascope | |
| | | | H02M 3/285 |
| 2018/0294732 A1 * | 10/2018 | Ye | H02M 3/33546 |
| 2019/0140639 A1 * | 5/2019 | Mao | H02M 3/33561 |

FOREIGN PATENT DOCUMENTS

| | | |
|---|---|---|
| CN | 104092316 A | 10/2014 |
| CN | 204244077 U | 4/2015 |
| CN | 105191100 A | 12/2015 |
| EP | 2597766 A2 | 5/2013 |
| EP | 2996237 A1 | 3/2016 |
| EP | 3021474 B1 | 10/2018 |
| JP | 2010011625 A | 1/2010 |
| WO | 2013075623 A1 | 5/2013 |

OTHER PUBLICATIONS

Chen et al., "Snubberless Bidirectional DC-DC Converter With New CLLC Resonant Tank Featuring Minimized Switching Loss," IEEE Transactions on Industrial Electronics, vol. 57, No. 9, Sep. 2010, pp. 3075-3086.

* cited by examiner

DC-DC CONVERTER AND CONTROL METHOD

TECHNICAL FIELD

The invention relates to conversion of DC power input into DC power output, and more particularly to DC to DC conversion with intermediate conversion into AC.

BACKGROUND ART

Conventional wide-range bidirectional resonant converters are generally classified into two types: two-stage structure, and one stage with online parameter change. In the former type, one additional conversion stage is dedicatedly added to extend the voltage gain range, while the original stage has little voltage regulation capability. In the latter type, multiple voltage gain ranges can be generated by changing the converter parameters, including resonant component parameters or transformer turn ratio.

Figure 1:
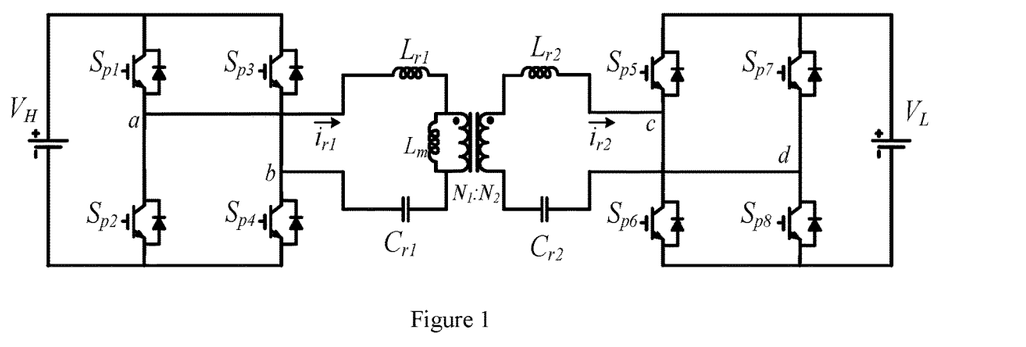
FIG. 1 shows a topology of conventional bidirectional DC/DC resonant converter.

FIG. 1 shows a topology of conventional bidirectional DC/DC resonant converter. As shown in FIG. 1, $V_H$ and $V_L$ are the voltages of the two DC ports of the converter. Due to the topological symmetry, the converter operations in the two power transferring directions are the same. To simplify the analysis, $V_H$ is the high voltage side, which is assumed as the DC bus side. $V_L$ is the low voltage side, which is assumed as the terminal voltage of the battery or supercapacitor. Thus $V_L$ usually has a wide operation range. Its maximum value $V_{Lmax}$ can be above 2.5 times of the minimal value $V_{Lmin}$. $V_H$ has a relatively smaller variation, the ratio of $V_{Hmax}$ to $V_{Hmax}$ is usually below 1.5. When power is transferred from $V_H$ to $V_L$, the converter is defined to work in forward mode, and vice versa.

Figure 2A:
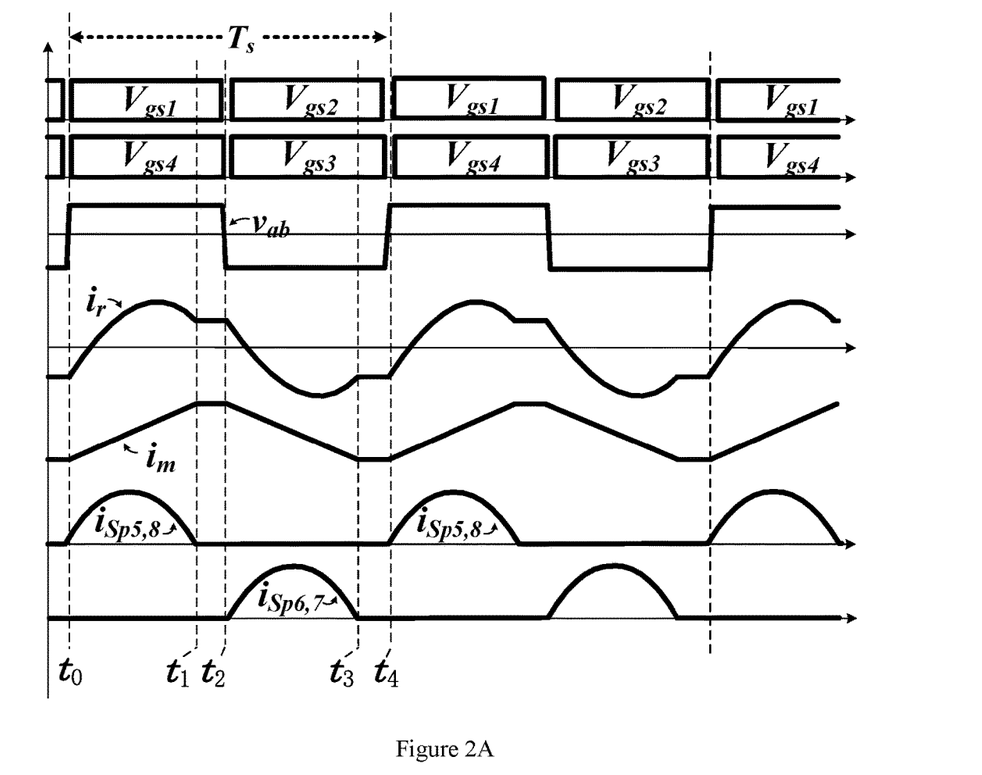
FIG. 2A shows the full-bridge mode in forward direction of the conventional bidirectional DC/DC resonant converter.

In order to increase the voltage gain range in forward direction, full-bridge and half bridge operation modulations are both used. The full-bridge mode in forward direction is shown in FIG. 2A. Because the switches on the rectification side turn off with ZCS when the switching frequency $f_s$ is below the resonant frequency $f_r$, only the waveforms in this range are shown. $T_s$ is the switching cycle. $V_{ab}$ is the voltage across the midpoints of the two primary legs. N is the transformer turn ratio, and $N=N_2/N_1$. $V_{gs1}$~$V_{gs8}$ are the gate signals of the eight switches. $i_{r1}$ and $i_{r2}$ are the primary and secondary resonant currents. The $V_L$-side switches $S_{p5}$-$S_{p8}$ are not turned on, and only their antiparallel diodes are used. $S_{p1}$ and $S_{p4}$ have the same gate signal, and so do $S_{p2}$ and $S_{p3}$. The duty cycle of all the four switches is 0.5. Because the diagonal switches have the same gate signals, $V_{ab}$ is a bipolar square wave. The voltage gain is regulated by changing the switching frequency, which is $G_{ff}=N \cdot g_{ff}$. $g_{ff}$ is the AC voltage gain regardless of the transformer turn ratio, which is controlled by the switching frequency. $g_{ff}$ decreases as $f_s$ increases. When the converter works in backward direction, the modulation is the same, and the voltage gain from $V_L$ to $V_H$ is $G_{fb}=1/N \cdot g_{fb}$.

Figure 2B:
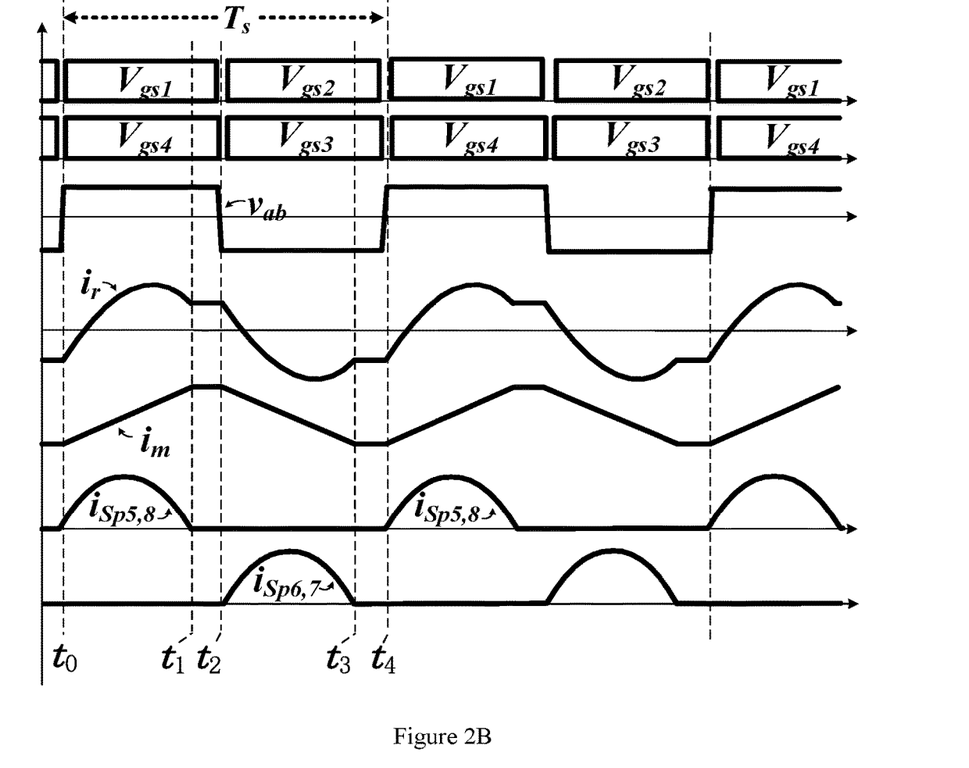
FIG. 2B shows the half-bridge modulation in forward direction of the conventional bidirectional DC/DC resonant converter.

When $V_L$ becomes very low, instead of further increasing the switching frequency to extremity, the converter can work in half bridge mode to reduce the gain by roughly half. The half-bridge modulation in forward direction is shown in FIG. 2B. The operation of the converter is the same as that in the full bridge mode, except that the amplitude of the AC component of $V_{ab}$ is half of that in the full-bridge mode, $V_L$ becomes half at the same switching frequency and equivalent load. Thus the gain is indicated as $G_{hf}=0.5N \cdot g_{hf}$. The conversion gain in backward direction should be $G_{hb}=2/N \cdot g_{hb}$ to match the two port voltages.

These converters exhibit characteristics of step-up during power transfer in the forward direction and characteristics of step-down in the backward direction, which would be problematic for some applications requiring step-up in the backward direction.

As regards electric vehicle charger for example, in a normal mode of operation, the converter works in a step-down mode to charge and maintain the voltage of a low voltage DC battery, e.g., a 48 volt DC battery, from the high voltage, e.g., 400 volt DC, available via the power grid. In an emergency mode, it would be desirable to have the DC-DC converter work in a step-up mode to boost the low voltage (48 volt) to a high voltage (400 volt) to feed the HVAC system. The conventional converters would not have supplied voltage in a backward direction at a higher level required by feeding the AC grid with the power provided by the low voltage DC battery.

In another example, both the DC battery and supercapacitor have a wide operational voltage range to be fully charged or discharged. The ratio of the highest and lowest terminal voltages can be above 2.5. Moreover, the bus voltage of the AC grid can also be variable for flexible power control. Therefore, it is desirable that the DC/DC converter may work over a wide voltage range in order to fully take advantage of the energy storage devices.

Using the DC-DC converter in step-up mode is a high-power operation. Accordingly, it is desired to have high conversion efficiency in step-up operation so as not to waste valuable energy. In contrast, the step-down operation can be high power (when the battery is empty and must be recharged rapidly) or low power (when the battery is less than fully charged). Accordingly, it would be desirable to enhance the low power efficiency of a bidirectional DC-DC converter with no added active or passive components and with no modification in high power operation and at no additional cost.

BRIEF SUMMARY OF THE INVENTION

According to one aspect of present invention, it provides a DC to DC converter, including: a first converter circuit; a second converter circuit; a transformer, having a primary winding and a secondary winding; a first resonant tank having a first capacitive element and a first inductive element, being coupled between the first converter circuit and the primary winding of the transformer; and a second resonant tank having a second capacitive element and a second inductive element, being coupled between the second converter circuit and the secondary winding of the transformer; wherein during power transfer from the second converter circuit to the first converter circuit: a first plurality of first power-semiconductor-devices of the first converter circuit are operable to charge the first capacitive element during a first half cycle of a switching period; and a second plurality of the first power-semiconductor-devices of the first converter circuit are operable to provide an output voltage comprising an voltage across the primary winding of the transformer and the voltage of the first capacitive element superimposed thereon.

According to another aspect of present invention, it provides a method of operating a DC to DC converter including a second converter circuit, a first converter circuit, a transformer having a primary winding and a secondary winding, a first resonant tank having a first capacitive element and a first inductive element, being coupled between the second converter circuit and the primary winding of the transformer, and a second resonant tank having a second capacitive element and a second inductive element, being coupled between the first converter circuit and the secondary winding of the transformer, the method includes: during power transfer from the second converter circuit to the first converter circuit: operating a first plurality of first power-semiconductor-devices of the first converter circuit to charge the first capacitive element during a first half cycle of a switching period; and operating a second plurality of the first power-semiconductor-devices of the first converter circuit to provide an output voltage comprising an voltage across the second winding of the transformer and the voltage of the first capacitive element superimposed thereon.

By using the DC to DC converter and the control method according to present invention, in a stage of the DC to DC converter operation, an electrical loop may be formed involving the series-coupled first capacitive element of the first resonant tank of the first converter circuit, primary winding of the transformer, and load receiving the power transferred from the second converter circuit to the first converter circuit (backward direction), and the voltage across the first capacitive element is controlled to have the same polarity as that induced on the primary winding of the transformer. The superimposition of the first capacitive element voltage on the first winding voltage makes it possible for charging a load of voltage source of higher level, which otherwise could not be achieved by both of the first converter circuit and the second converter circuit each working at optimal operating point set by its resonant frequency. This provides step-up gain for the backward direction, the first converter circuit operating in double voltage rectification manner and the second converter circuit working in the conventional full-bridge modulation with switching frequency fixed substantially at the resonant frequency. As a result, the resonant current becomes smaller, which causes decrease of conduction losses. Moreover, since a small magnetizing inductance becomes unnecessary, a smaller air gap may be used, which would suppress to remarkable eddy losses from proximate windings and thus decreases the transformer temperature.

Preferably, one of the first plurality of the first power-semiconductor-devices is configured to have an active power switch with an anti-paralleled power diode, wherein the active power switch is closed starting from a beginning of the first half cycle of the switching period until an end of a first portion of the first half cycle of the switching period.

Preferably, the one of the first plurality of the first power-semiconductor-devices is shared between the first plurality of the first power-semiconductor-devices and the second plurality of the first power-semiconductor-devices; another one of the second plurality of the first power-semiconductor-devices has a power diode; and both of the one of the first plurality of the first power-semiconductor-device and the another one of the second plurality of the first power-semiconductor-devices are operable to conduct from a beginning of the second half cycle of the switching period until an end of a second portion of the second half cycle of the switching period.

The electrical energy stored in the first capacitive element together with the electrical energy and magnetic energy stored in the first inductive element, the second capacitive element, and the second inductive element drives the resonant current flowing through the first inductive element exhibiting sinusoidal manner, eventually the current will reach zero. Thus, a precondition for ZCS turn-on of the one of the first plurality of the first power-semiconductor-device in the next switching cycle, enhancing the power conversion efficiency.

Preferably, parameters of the first resonant tank are selected such that a resonant current at a side of the primary winding of the transformer reaches zero before the first portion of the first half cycle of the switching period. Thus, a precondition for ZCS turn-on of the one of the first plurality of the first power-semiconductor-device in the next operation stage, enhancing the power conversion efficiency.

Preferably, a switching frequency of the first converter circuit and that of the second converter circuit are the same.

Preferably, during power transfer from the first converter circuit to the second converter circuit: the first converter circuit and the first resonant tank are operable in series resonant conversion of converting an input voltage into an immediate voltage for input to the second resonant tank; and the second resonant tank and the second converter circuit are operable in series resonant conversion of the immediate voltage to provide an output voltage. This provides the DC to DC converter with functionality of bi-directional conversion that not only allows for a full control of the output voltage in both direction of power transfer, but when properly dimensioned, can provide ZVS for the first converter circuit and the second converter circuit in forward conversion and in the backward conversion ZVS for the second converter circuit and ZCS for the first converter circuit. The combination of ZVS and ZCS for all devices enhances the power conversion efficiency. Besides, different functionalities are carried out by using the first capacitive element, either in the forward direction as of resonant element of the first resonant tank where the first converter circuit operates in LLC mode, or in the backward direction as of voltage lifting device where the first converter operates in double voltage rectification mode. A wide output voltage range is achieved for the single-stage resonant converter for both forward and backward directions, which is required, for example, for battery or supercapacitor applications.

BRIEF DESCRIPTION OF THE DRAWINGS

The subject matter of the invention will be explained in more detail in the following text with reference to preferred exemplary embodiments which are illustrated in the drawings, in which.

The reference symbols used in the drawings, and their meanings, are listed in summary form in the list of reference symbols. In principle, identical parts are provided with the same reference symbols in the figures.

PREFERRED EMBODIMENTS OF THE INVENTION

Figure 3:
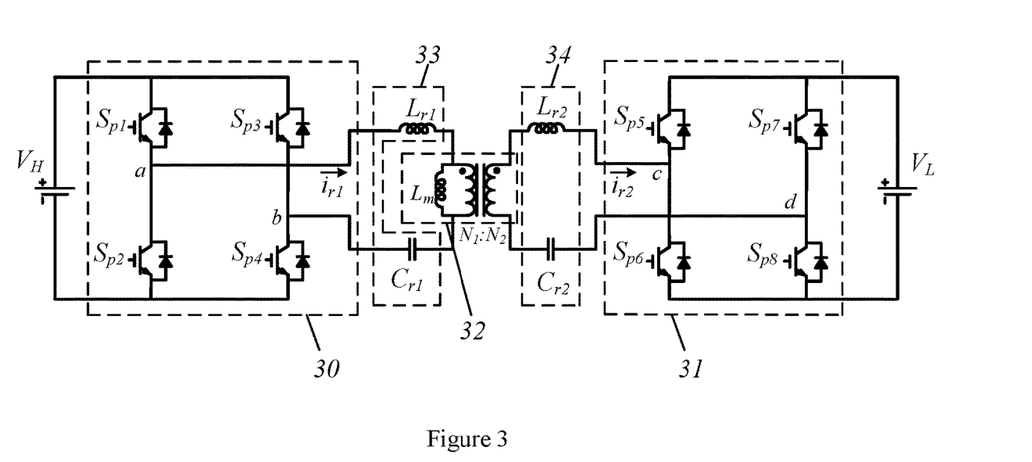
FIG. 3 illustrates a schematic of an example embodiment of the DC to DC converter embodying the principles of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected". FIG. 3 illustrates a schematic of an example embodiment of the DC to DC converter embodying the principles of the present invention. As shown in FIG. 3, the DC to DC converter 3 includes a first converter circuit 30, a second converter circuit 31, a transformer 32 having a primary winding N1 and a secondary winding N2, a first resonant tank 33 having a first capacitive element $C_{r1}$ and a first inductive element $L_{r1}$, and a second resonant tank 34 having a second capacitive element $C_{r2}$ and a second inductive element $L_{r2}$. The first converter circuit 30 is of full-bridge topology containing a plurality of first power-semiconductor-devices $S_{p1}$, $S_{p2}$, $S_{p3}$, $S_{p4}$ that each includes an active power switch with an anti-paralleled power diode. The anti-paralleled power diodes may be embedded, or external, anti-parallel diodes. The first power-semiconductor-devices $S_{p1}$, $S_{p2}$, $S_{p3}$, $S_{p4}$ employed by the present invention can include MOSFETs, IGBTs, GTOs, BJTs by way of non-limiting example. The first converter circuit 30 is connected to a first DC voltage source $V_H$ exhibiting a voltage potential higher than a second DC voltage source $V_L$ which will described thereafter. For example, the first DC voltage source $V_H$ may be DC voltage source as a result of rectifying an AC source supplied by an AC grid, and the second DC voltage source $V_L$ may be an electric vehicle battery or supercapacitor. A filter capacitor (not shown) is connected in parallel to the first DC voltage source $V_H$ to filter out switching ripple. The first resonant tank 33 is coupled between the first converter circuit 30 and the primary winding N1 of the transformer 32 at the terminals a and b which are the joint point of the first power-semiconductor-devices in the same leg of the first converter circuit 30. The ends of the secondary windings N2 are connected to the second converter circuit 31.

The second converter circuit 31 is of full-bridge topology including a plurality of second power-semiconductor-devices $S_{p5}$, $S_{p6}$, $S_{p7}$, $S_{p8}$ that each includes an active power switch with an anti-paralleled power diode. The anti-paralleled power diodes may be embedded, or external, anti-parallel diodes. The first power-semiconductor-devices $S_{p5}$, $S_{p6}$, $S_{p7}$, $S_{p8}$ employed by the present invention can include MOSFETs, IGBTs, GTOs, BJTs by way of non-limiting example. The second converter circuit 31 is connected to the second DC voltage source $V_L$. A filter capacitor (not shown) is connected in parallel to the second DC voltage source $V_L$ to filter out switching ripple. The second resonant tank 34 is coupled between the two terminals c, d of the second converter circuit 31 and the secondary winding N2 of the transformer 32, and the terminals c and d which are the joint point of the second power-semiconductor-devices in the same leg of the second converter circuit 31.

The second power-semiconductor-devices $S_{p5}$, $S_{p6}$, $S_{p7}$, $S_{p8}$ are turned on and off with approximately 50% duty cycle width and their switching frequency is controlled so that the first converter circuit 30 produces square-wave voltage waveform with 50% duty cycle and variable frequency on terminals c and d. The second resonant tank 34 and magnetizing inductor $L_m$ are coupled to the terminals c and d. Magnetising inductor $L_m$ is connected in parallel with the secondary winding N2 of transformer 32. To reduce the number of magnetic components magnetising inductor $L_m$ is usually embedded in the magnetic structure of transformer 32. The value of the magnetising inductance can be controlled in such case by introducing an air gap in the magnetic core and adjusting its length.

An "LLC converter" is a series type, frequency controlled, resonant converter typically having three resonant components: a resonant capacitor, a resonant inductor and a magnetizing inductor, which finds its implementation in the embodiment of FIG. 1 as a combination of the second converter circuit 31, the second resonant tank 34 and the Magnetising inductor $L_m$. The resonant components of the LLC converter, including the second capacitive element $C_{r2}$, the second inductive element $L_{r2}$ and the magnetising inductor $L_m$, can be selected (in relation to the resonant frequency) in such a way that the converter will provide zero voltage switching (ZVS) for the switching devices connected to the power source (i.e. the second DC voltage source $V_L$) and zero current switching (ZCS) for the switching devices connected to load (i.e. the secondary winding N2 of the transformer 32). In addition, the resonant component selection can be done in a way that the ZVS and ZCS can be maintained when operating from no-load to full-load conditions. An LLC converter design procedure for meeting the above features is outlined in paper by S. Zong, H. Luo, W. Li, Y. Deng and X. He, "Asymmetrical Duty Cycle-Controlled LLC Resonant Converter With Equivalent Switching Frequency Doubler," IEEE Trans. Power Electron., vol. 31, no. 7, pp. 4963-4973, July 2016; S. Zong, H. Luo, W. Li, Y. Deng and X. He, "High-power bidirectional resonant DC-DC converter with equivalent switching frequency doubler," IET Renewable Power Generation, vol. 10, no. 6, pp. 834-842, July 2016. The optimal selection of the resonant components typically results in magnetising inductance value being much larger than the resonant inductance value. However, since the voltage gain and power are controlled by changing the switching frequency of the resonant converters and the ranges of the output power and voltage of the converter are determined by the resonant components and the load, in order to achieve wide voltage range, the magnetizing inductance of the transformer should be designed much smaller than usual. As a result, the resonant current becomes much higher, which causes dramatic conduction losses. Moreover, in order to realize a small magnetizing inductance, a large air gap must be used, which would lead to remarkable eddy losses from proximate windings and thus increases the transformer temperature. Therefore, the LLC resonant converter by itself is not suitable for working for wide voltage gain range applications, for example in the case of power transfer from the second converter circuit 31 to the first converter circuit 30 (backward direction) in FIG. 1.

In order to achieve step-up gain for the backward direction, a first modulation scheme is applied to the first converter circuit 30. And a second modulation scheme is applied to the second converter circuit 31 such that its second power-semiconductor-devices $S_{p5}$, $S_{p6}$, $S_{p7}$, $S_{p8}$ are turned on and off with approximately 50% duty cycle width and their switching frequency is fixed at substantially the resonant frequency so that the second converter circuit 31 produces square-wave voltage waveform with 50% duty cycle and fixed frequency on terminals c and d. Namely, the second converter circuit 31 works in the conventional full-bridge modulation with switching frequency fixed substantially at the resonant frequency.

Figure 4A:
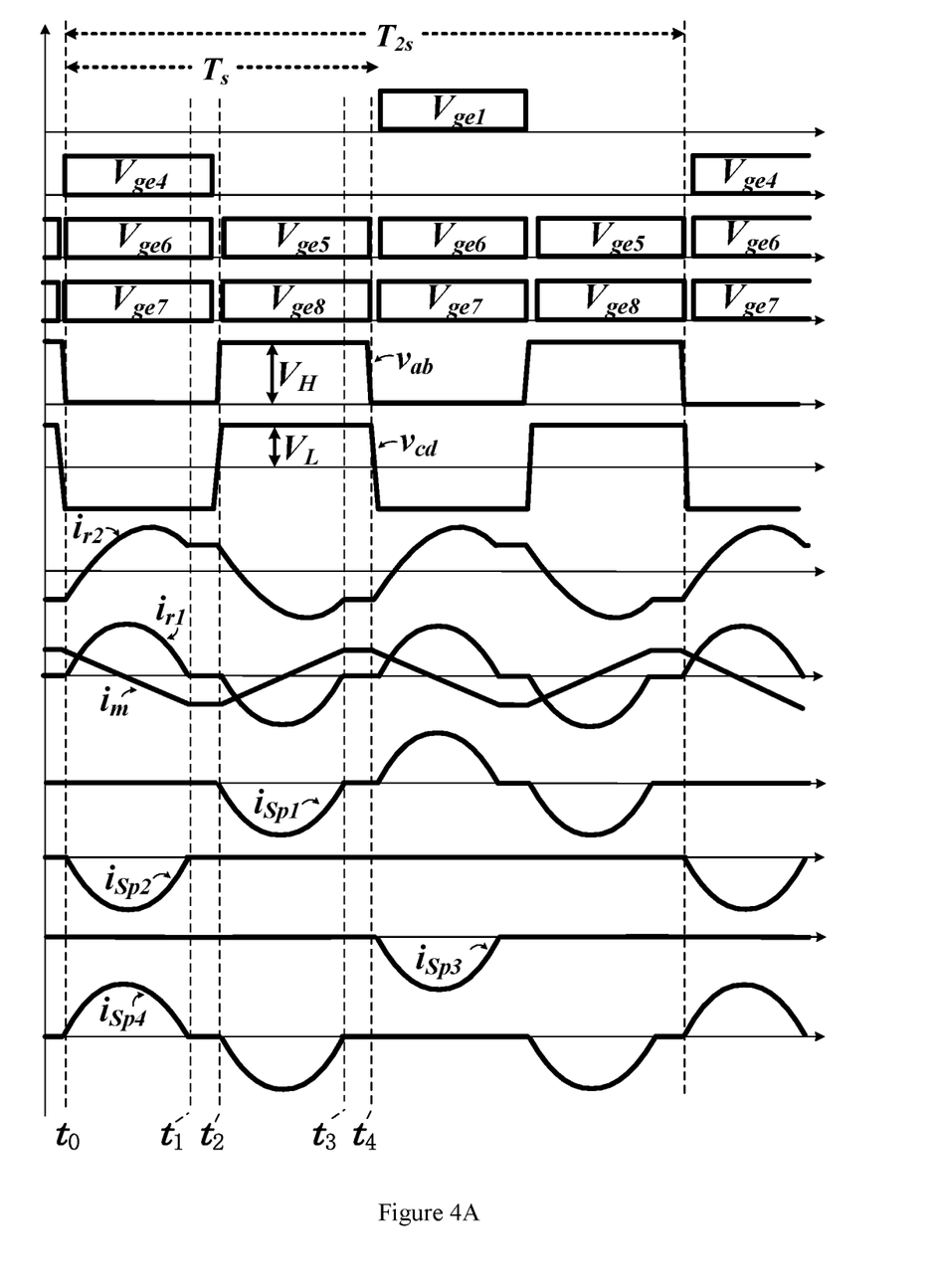
FIG. 4A and FIG. 4B respectively illustrate the modulation schemes and equivalent circuit of each state of the DC to DC converter.
Figure 4B:
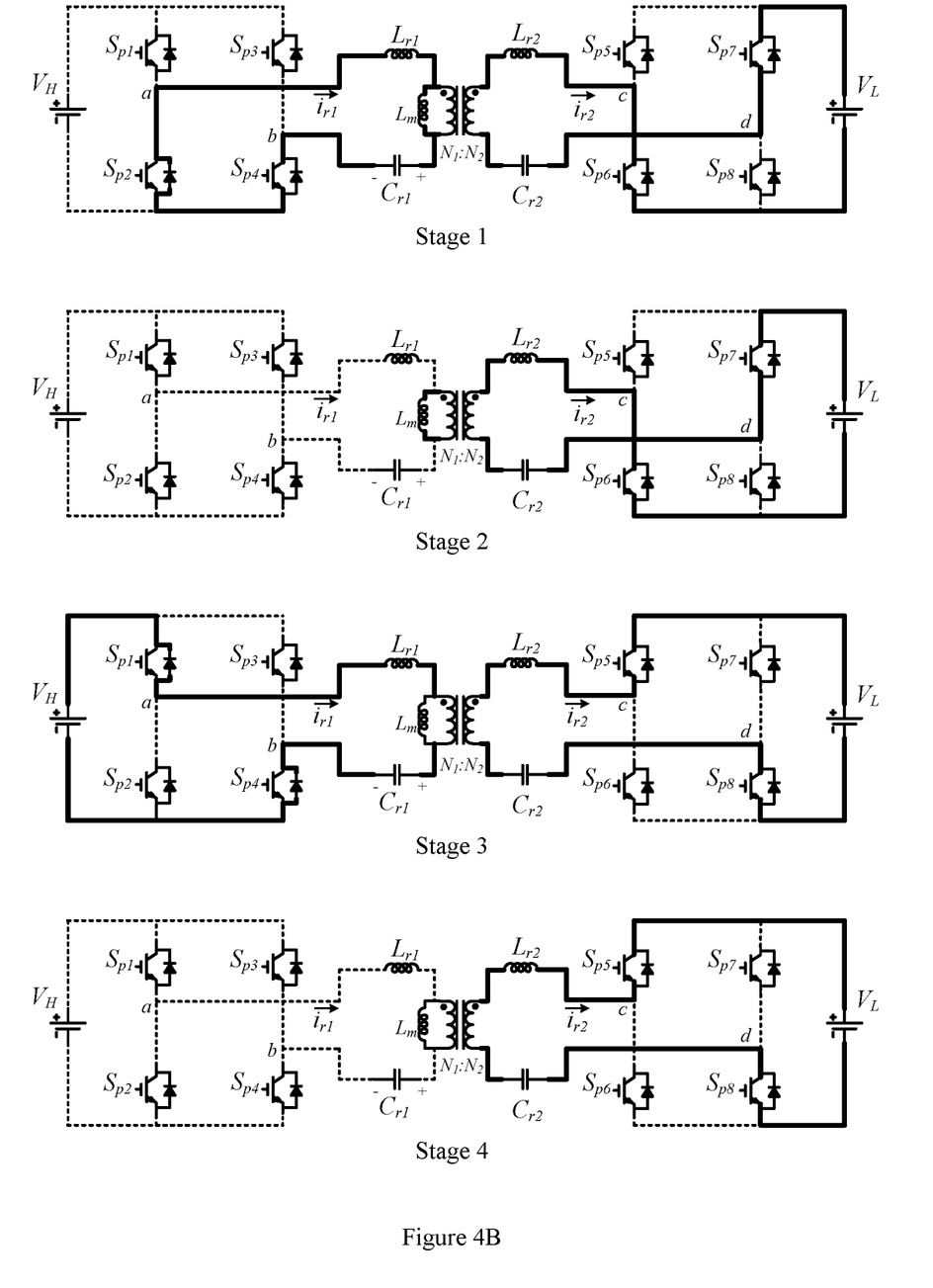

FIG. 4A and FIG. 4B respectively illustrate the modulation schemes and equivalent circuit of each state of the DC to DC converter. As shown in FIGS. 4A and 4B, the operation of the first converter circuit may have four stages, wherein $V_{ab}$ and $V_{cd}$ respectively indicate the voltage across terminals a and b and that across the terminals c and d; $i_{r1}$ indicates the current flowing through the first inductive element $L_{r1}$, and $i_{r2}$ indicates the current flowing through the second inductive element $L_{r2}$; $i_m$ indicates the magnetizing current; $i_{sp1}$, $i_{sp2}$, $i_{sp3}$, $i_{sp4}$ respectively indicate the current following via the first power-semiconductor-devices $S_{p1}$, $S_{p2}$, $S_{p3}$, $S_{p4}$, $T_s$ indicates the switching period.

Stage 1 [$t_0$, $t_1$]: $S_{p6}$ and $S_{p7}$ turn on in this stage, and $V_{cd}=-V_L$. No current is flowing in the $V_H$-side resonant tank before this stage. Thus, $S_{p4}$ may turn on with ZCS. The resonant current $i_{r1}$ flows through $S_{p4}$ and the antiparallel diode of $S_{p2}$. Because the DC bias voltage on $C_{r1}$ is 0.5$V_H$, the resonance among the primary and secondary resonant tanks is the same as that with the full-bridge modulation. Resonant currents $i_{r1}$ and $i_{r2}$ increase in a sinusoidal manner at the resonant frequency $f_r$, and the magnetizing current $i_m$ increases roughly linearly. Power is transferred from the $V_L$ side to $C_{r1}$ during this stage. At this stage, a first plurality of first power-semiconductor-devices $S_{p2}$, $S_{p4}$ of the first converter circuit 30 are operating to charge the first capacitive element $C_{r1}$ during a first half cycle of a switching period $T_s$, the anti-paralleled diode of $S_{p2}$ conducting freewheeling and $S_{p4}$ is turned on. The first plurality of first power-semiconductor-devices, for example, may be lower switches $S_{p2}$, $S_{p4}$ of the two phase-legs of the first converter circuit 30 as shown in FIG. 4B, or alternatively upper switches $S_{p1}$, $S_{p3}$ of the two phase-legs.

Stage 2 [$t_1$, $t_2$]: When resonant current $i_{r1}$ decreases to zero, the antiparallel diode of $S_{p2}$ turns off with ZCS, causing no reverse recovery problem. The resonance among $L_{r2}$, $C_{r2}$ and $L_m$ begins. Because $L_m$ is usually much larger than $L_{r2}$, $i_{r2}$ and $i_m$ barely change during this stage.

For both of the stages 1 and 2 [$t_0$, $t_2$], one of the first plurality of the first power-semiconductor-devices $S_{p4}$ has an active power switch with an anti-paralleled power diode, and the active power switch is closed starting from a beginning of the first half cycle of the switching period to until an end of a first portion of the first half cycle of the switching period, for example the first portion occurs between $t_1$ and $t_2$. The parameters of the first resonant tank 33 having a first capacitive element $C_{r1}$ and a first inductive element $L_{r1}$ may be selected such that a resonant current $i_{r1}$ at a side of the primary winding N1 of the transformer 32 reaches zero before the first portion of the first half cycle of the switching period $T_s$. The above description holds true for the alternative solution of turning on of upper switches $S_{p1}$, $S_{p3}$ of the two phase-legs in stage 1, and one of them, for example $S_{p3}$ may use an active power switch with an anti-paralleled power diode.

Stage 3 [$t_2$, $t_3$]: After $S_{p6}$ and $S_{p7}$ turn off, $i_{r1}$ flows through the antiparallel diodes of $S_{p5}$ and $S_{p8}$. Thus $S_{p5}$ and $S_{p8}$ turn on with ZVS, causing no turning on losses. The resonant tank is powered by the low voltage side $V_L$. Resonance begins among $L_{r1}$, $L_{r2}$, $C_{r1}$ and $C_{r2}$, and $i_{r2}$ increases in a sinusoidal manner at the resonant frequency $f_r$. The power is transmitted via the $V_H$ side through the transformer. The active switches on $V_H$ side are all turned off. Due to the DC bias voltage across $C_{r1}$, $i_{r1}$ is pumped to $V_H$ through the antiparallel diodes of $S_{p1}$ and $S_{p4}$, and thus $V_{ab}=V_H$. A second plurality of the first power-semiconductor-devices $S_{p1}$, $S_{p4}$ of the first converter circuit 30 are operating to provide an output voltage $V_H$ comprising an voltage across the primary winding N1 of the transformer 32 and the voltage of the first capacitive element $C_{r1}$ superimposed thereon for lifting the voltage across the primary winding N1. The above description holds true for the alternative solution of turning on of upper switches $S_{p1}$, $S_{p3}$ of the two phase-legs in stage 1 and $S_{p3}$ having active power switch with an anti-paralleled power diode, DC bias voltage across $C_{r1}$, $i_{r1}$ is pumped to $V_H$ through the antiparallel diodes of $S_{p2}$ and $S_{p3}$, and thus $V_{ab}=V_H$.

Stage 4 [$t_3$, $t_4$]: Similar to Stage 2, when resonant current $i_{r1}$ decreases to zero, the antiparallel diode of $S_{p4}$ turns off with ZCS, causing no reverse recovery problem. Resonant $i_{r2}$ and magnetizing current $i_m$ barely change during this stage. As regards the alternative solution, the antiparallel diode of $S_{p3}$ turn off with ZCS.

For both of the stages 3 and 4 [$t_2$, $t_4$], one first power-semiconductor-devices $S_{p4}$ is shared between the first plurality of the first power-semiconductor-devices $S_{p2}$, $S_{p4}$ and the second plurality of the first power-semiconductor-devices $S_{p1}$, $S_{p4}$, another one $S_{p1}$ of the second plurality of the first power-semiconductor-devices has a power diode. Both of the one $S_{p4}$ of the first plurality of the first power-semiconductor-device and the another one $S_{p1}$ of the second plurality of the first power-semiconductor-devices may operate to conduct from a beginning of the second half cycle of the switching period $t_2$ until an end of a second portion of the second half cycle of the switching period, for example the second portion occurs between $t_3$ and $t_4$. As to the alternative solution, switch $S_{p3}$ is selected as the common one of the first plurality of the first power-semiconductor-devices $S_{p1}$, $S_{p3}$ and the second plurality of the first power-semiconductor-devices $S_{p2}$, $S_{p3}$.

The operation in the next $T_s$ is similar to the previous switching cycle. $V_{ab}$ steps between zero and $V_H$ in each $T_s$. In order to generate zero voltage on $V_{ab}$, two paths are available: $S_{p4}$ to $S_{p2}$, and $S_{p3}$ to $S_{p1}$ (alternatively, $S_{p3}$ to $S_{p1}$, and $S_{p4}$ to $S_{p2}$). The two paths are rotated in every two switching cycles to balance the thermal condition, as shown in the duration $T_{2s}$. When $V_{ab}=V_H$, $i_{r1}$ is negative, and only one path is available: $S_{p1}$ to $S_{p4}$. The voltage across $C_{r1}$ and the primary voltage of the transformer are stacked up to transfer energy to $V_H$. When $V_{ab}=0$, the energy is transferred from $V_L$ to $C_{r1}$. $C_{r1}$ can be considered as an energy buffer in this half cycle. When $V_{ab}=V_H$, the energy injected into $C_{r1}$ in the previous half cycle is released to $V_H$. The operation on the $V_H$ side is a double voltage rectification with resonant manner. The steady-state DC bias of $V_{cr1}$ is the average voltage of $V_{ab}$, which is 0.5 $V_H$.

By using the above modulation schemes applied to the DC to DC converter, in the stage 3 [$t_2$, $t_3$], the electrical energy stored in the first capacitive element $C_{r1}$ together with the electrical energy and magnetic energy stored in the other resonant components $L_{r1}$, $L_{r2}$, $C_{r2}$ drives the current $i_{r1}$ exhibiting sinusoidal manner, eventually the current $i_{r1}$ will reach zero. Thus, a precondition for ZCS turn-on of the switch $S_{p4}$ in the next switching cycle. Besides, in the stage 1 [$t_0$, $t_1$], the power from the second DC voltage source $V_L$ drives the current $i_{r2}$ inducing the current $i_{r1}$ at the primary side of the transformer 32, which in turn charges the capacitive element $C_{r1}$ sufficient for pumping the DC bias voltage across it to the first DC voltage source $V_H$ in the stage 3 [$t_2$, $t_3$]. Thus, different functionalities are carried out by using the first capacitive element. Consequently, the DC to DC converter can perform step-up voltage conversion in the backward direction with its second converter circuit operating at the switching frequency substantially of the resonant frequency and maintain ZCS turn-on of the switches of its first converter circuit. This feature is very desirable for power converters, especially when a battery as power source is connected to their terminals supplying power to load of AC network. The step-up voltage conversion of the appropriately dimensioned LLC converter is accompanied with loss-less switching that is very desirable in achieving high power conversion efficiency and high power density.

Preferably, the switching frequency of the first converter circuit 30 and that of the second converter circuit 31 are the same.

From the equivalent circuit of each state of the DC to DC converter according to FIG. 4B, it can be seen that in the backward direction, only the first power-semiconductor-device $S_{p4}$ works in controlled mode, the rest of them $S_{p1}$, $S_{p2}$, $S_{p3}$ work either by free-wheeling or reverse-biasing of its antiparallel diode. Thus, the first power-semiconductor-devices $S_{p1}$, $S_{p2}$, $S_{p3}$ may use power diodes for substitution of MOSFETs, IGBTs, GTOs, BJTs.

Preferably, in case of power transfer from the first converter circuit 30 to the second converter circuit 31 (forward direction), by applying conventional modulation schemes of LLC converters, the first converter circuit 30 and the first resonant tank 33 may perform resonant conversion of converting an input voltage $V_H$ into an immediate voltage for input to the second resonant tank 34, and the second resonant tank 34 and the second converter circuit 31 may operate in series resonant conversion of the immediate voltage to provide an output voltage to the second DC voltage source $V_L$, such as a battery or supercapacitor. Therefore, by applying appropriated modulation schemes of LLC, the DC to DC converter can work in bi-direction. The output voltage range is largely extended.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A DC to DC converter, including:
a first converter circuit;
a second converter circuit;
a transformer, having a primary winding and a secondary winding;
a first resonant tank having a first capacitive element and a first inductive element, being coupled between the first converter circuit and the primary winding of the transformer; and
a second resonant tank having a second capacitive element and a second inductive element, being coupled between the second converter circuit and the secondary winding of the transformer;
wherein during power transfer from the second converter circuit to the first converter circuit;
a first plurality of first power-semiconductor-devices of the first converter circuit are operable to charge the first capacitive element during a first half cycle of a switching period; and
a second plurality of the first power-semiconductor-devices of the first converter circuit are operable to provide an output voltage comprising an voltage across the primary winding of the transformer and the voltage of the first capacitive element superimposed thereon.

2. The DC to DC converter according to claim 1, wherein:
one of the first plurality of the first power-semiconductor-devices is configured to have an active power switch with an anti-paralleled power diode, wherein the active power switch is closed starting from a beginning of the first half cycle of the switching period until an end of a first portion of the first half cycle of the switching period.

3. The DC to DC converter according to claim 1, wherein:
the one of the first plurality of the first power-semiconductor-devices is shared between the first plurality of the first power-semiconductor-devices and the second plurality of the first power-semiconductor-devices;
another one of the second plurality of the first power-semiconductor-devices has a power diode; and
both of the one of the first plurality of the first power-semiconductor-device and the another one of the second plurality of the first power-semiconductor-devices are operable to conduct from a beginning of the second half cycle of the switching period until an end of a second portion of the second half cycle of the switching period.

4. The DC to DC converter according to claim 1, wherein:
parameters of the first resonant tank are selected such that a resonant current at a side of the primary winding of the transformer reaches zero before the first portion of the first half cycle of the switching period.

5. The DC to DC converter according to claim 1, wherein:
a switching frequency of the first converter circuit and that of the second converter circuit are the same.

6. The DC to DC converter according to claim 1, wherein during power transfer from the first converter circuit to the second converter circuit:
the first converter circuit and the first resonant tank are operable in series resonant conversion of converting an input voltage into an immediate voltage for input to the second resonant tank; and
the second resonant tank and the second converter circuit are operable in series resonant conversion of the immediate voltage to provide an output voltage.

7. The DC to DC converter according to claim 2, wherein:
the one of the first plurality of the first power-semiconductor-devices is shared between the first plurality of the first power-semiconductor-devices and the second plurality of the first power-semiconductor-devices;
another one of the second plurality of the first power-semiconductor-devices has a power diode; and
both of the one of the first plurality of the first power-semiconductor-device and the another one of the second plurality of the first power-semiconductor-devices are operable to conduct from a beginning of the second half cycle of the switching period until an end of a second portion of the second half cycle of the switching period.

8. The DC to DC converter according to claim 2, wherein parameters of the first resonant tank are selected such that a resonant current at a side of the primary winding of the transformer reaches zero before the first portion of the first half cycle of the switching period.

9. The DC to DC converter according to claim 3, wherein parameters of the first resonant tank are selected such that a resonant current at a side of the primary winding of the transformer reaches zero before the first portion of the first half cycle of the switching period.

10. The DC to DC converter according to claim 2, wherein a switching frequency of the first converter circuit and that of the second converter circuit are the same.

11. The DC to DC converter according to claim 3, wherein during power transfer from the first converter circuit to the second converter circuit:
the first converter circuit and the first resonant tank are operable in series resonant conversion of converting an input voltage into an immediate voltage for input to the second resonant tank; and
the second resonant tank and the second converter circuit are operable in series resonant conversion of the immediate voltage to provide an output voltage.

12. A method of operating a DC to DC converter including a second converter circuit, a first converter circuit, a transformer having a primary winding and a secondary winding, a first resonant tank having a first capacitive element and a first inductive element, being coupled between the second converter circuit and the primary winding of the transformer, and a second resonant tank having a second capacitive element and a second inductive element, being coupled between the first converter circuit and the secondary winding of the transformer,
the method includes:
during first power transfer from the second converter circuit to the first converter circuit:
operating a first plurality of first power-semiconductor-devices of the first converter circuit to charge the first capacitive element during a first half cycle of a switching period; and
operating a second plurality of the first power-semiconductor-devices of the first converter circuit to provide an output voltage comprising an voltage across the second winding of the transformer and the voltage of the first capacitive element superimposed thereon.

13. The method according to claim 12, wherein one of the first plurality of the first power-semiconductor-devices is configured to have an active power switch with anti-paralleled power diode,
the method further includes:
closing the active power switch starting from a beginning of the first half cycle of the switching period until an end of a first portion of the first half cycle of the switching period.

14. The method according to claim 12, wherein the one of the first plurality of the first power-semiconductor-devices is shared between the first plurality of the first power-semiconductor-devices and the second plurality of the first power-semiconductor-devices, and another one of the second plurality of the first power-semiconductor-devices has a power diode,
the method further includes:
operating both of the one of the first plurality of the first power-semiconductor-device and the another one of the second plurality of the first power-semiconductor-devices to conduct from a beginning of the second half cycle of the switching period until an end of a second portion of the second half cycle of the switching period.

15. The method according to claim 12, wherein:
parameters of the first resonant tank are selected such that a resonant current at a side of the primary winding of the transformer reaches zero before the first portion of the first half cycle of the switching period.

16. The method according to claim 12, wherein:
a switching frequency of the first converter circuit and that of the second converter circuit are the same.

17. The method according to claim 12, wherein during power transfer from the first converter circuit to the second converter circuit:
operating the first converter circuit and the first resonant tank in series resonant conversion of converting an input voltage into an immediate voltage for input to the second resonant tank; and
operating the second resonant tank and the second converter circuit in series resonant conversion of the immediate voltage to provide an output voltage.

18. The method according to claim 13, wherein the one of the first plurality of the first power-semiconductor-devices is shared between the first plurality of the first power-semiconductor-devices and the second plurality of the first power-semiconductor-devices, and another one of the second plurality of the first power-semiconductor-devices has a power diode,
the method further includes:
operating both of the one of the first plurality of the first power-semiconductor-device and the another one of the second plurality of the first power-semiconductor-devices to conduct from a beginning of the second half cycle of the switching period until an end of a second portion of the second half cycle of the switching period.

19. The method according to claim 13, wherein parameters of the first resonant tank are selected such that a resonant current at a side of the primary winding of the transformer reaches zero before the first portion of the first half cycle of the switching period.

20. The method according to claim 13, wherein parameters of the first resonant tank are selected such that a resonant current at a side of the primary winding of the transformer reaches zero before the first portion of the first half cycle of the switching period.

* * * * *